United States Patent
Kuieck et al.

(10) Patent No.: US 12,416,521 B2
(45) Date of Patent: *Sep. 16, 2025

(54) DEVICE WITH AERATION MITIGATION FOR IMPROVED MEASUREMENT OF FLUIDS

(71) Applicant: SHAW DEVELOPMENT, LLC, Bonita Springs, FL (US)

(72) Inventors: Bryan Kuieck, Estero, FL (US); Christopher Godfrey, Fort Myers, FL (US); Steven Milette, Naples, FL (US); Michael O'Hara, Naples, FL (US); Christian Braun, Lehigh Acres, FL (US); Sree Hyma Sudhakar Paruchuri, Bonita Springs, FL (US)

(73) Assignee: SHAW DEVELOPMENT, LLC, Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,891

(22) Filed: Apr. 22, 2024

(65) Prior Publication Data

US 2025/0093193 A1 Mar. 20, 2025

Related U.S. Application Data

(63) Continuation of application No. 17/049,692, filed as application No. PCT/US2019/029123 on Apr. 25, 2019, now Pat. No. 11,965,768.
(Continued)

(51) Int. Cl.
G01F 23/296 (2022.01)
G01F 23/2962 (2022.01)

(52) U.S. Cl.
CPC .................. *G01F 23/2962* (2013.01)

(58) Field of Classification Search
None
See application file for complete search history.

(56) References Cited

U.S. PATENT DOCUMENTS 5,211,194 A * 5/1993 Scott ............... B60K 15/06
137/590
5,614,831 A 3/1997 Edvardsson
(Continued)

OTHER PUBLICATIONS

Extended European Search Report in EP19850531.5, mailed Jan. 10, 2022, 6 pages.
(Continued)

*Primary Examiner* — Daniel S Larkin
(74) *Attorney, Agent, or Firm* — McDonald Hopkins LLC (57) ABSTRACT

A housing assembly for a fluid sensor assembly includes a housing having a first and second sensing volumes. A fluid port attached to the housing has a porous membrane covering first and second fluid apertures. The first sensing volume included a vertically-oriented waveguide and is fluidly coupled to an exterior of the housing through the first fluid aperture, where the first aperture port has an area smaller than an area of a cross-section of the waveguide. The second sensing volume is coupled to the exterior of the housing through the second fluid aperture, the second fluid aperture having an area larger than a cross-section of the second sensing volume. While the first sensing volume and the second sensing volume are both in fluid communication with an exterior of the housing, the fluid port and porous membrane internally isolate the first sensing volume from the second sensing volume.

18 Claims, 9 Drawing Sheets

Related U.S. Application Data

(60) Provisional application No. 62/662,268, filed on Apr. 25, 2018.

(56) References Cited

U.S. PATENT DOCUMENTS

| | | |
|---|---|---|
| 9,377,441 B2 * | 6/2016 | Reimer ............... G01N 29/024 |
| 2012/0152015 A1 | 6/2012 | Beyer et al. |
| 2012/0234091 A1 | 9/2012 | Niemann et al. |
| 2014/0026990 A1 * | 1/2014 | Delihas .................... F17D 3/01 137/558 |
| 2015/0300902 A1 | 10/2015 | Rabe et al. |
| 2015/0337708 A1 * | 11/2015 | Schlenke ............ G01M 15/102 96/155 |
| 2016/0238429 A1 | 8/2016 | Stangl et al. |
| 2017/0227456 A1 | 8/2017 | Tao et al. |
| 2021/0239509 A1 | 8/2021 | Kuieck et al. |

OTHER PUBLICATIONS

International Search Report and Written Opinion in PCT/US2019/029123, mailed Jan. 30, 2020, 7 pages.

\* cited by examiner

DEVICE WITH AERATION MITIGATION FOR IMPROVED MEASUREMENT OF FLUIDS

CROSS-REFERENCE TO RELATED APPLICATION

This application is a continuation of U.S. Utility application Ser. No. 17/049,692 filed on Oct. 22, 2020, now U.S. Pat. No. 11,965,768, which is a 35 U.S.C. 371 national stage filing of PCT Application No. PCT/US2019/029123, filed on Apr. 25, 2019, which claims priority to U.S. Provisional Patent Application No. 62/662,268 filed on Apr. 25, 2018, the disclosures of which are incorporated herein by reference in their entireties.

BACKGROUND

Diesel Exhaust Fluid (DEF) tanks have become standard on diesel powered ground vehicles since 2010 in the United States of America. DEF is a reduction agent that is an Aqueous Urea Solution (AUS) used in Selective Catalytic Reduction (SCR) diesel emissions systems. DEF has unique properties and it critical to the performance of the emissions systems on diesel engine equipment equipped with SCR. As such, it is typical to provide multiple sensors in the DEF reservoir. These sensors monitor the fluid level, fluid temperature and fluid concentration (urea in water). Multiple sensor strategies are used to discern the reservoir and fluid conditions. Most, if not all, sensor technologies (e.g., ultrasonic, thermal dispersion, infrared spectrographic, etc.) are sensitive to air in the DEF. Entrained air (bubbles) changes the physical characteristics of DEF as well as the behavior of the sensor. Regardless of the parameter being measured (speed of sound, resistance/conductance, specific heat, dynamic viscosity, optical characteristic, etc.), air in the fluid will impact the measurement.

The air bubbles that impact sensor function can be categorized into two types. First, volumes of trapped air in a confined space create larger bubbles (approximately 0.002 ml or greater in size) These larger bubbles have higher buoyancy and typically rise easily in the liquid. The second type of air bubbles are extremely small and referred to as "micro-bubbles" or "nano bubbles". These "micro-bubbles" have relatively low buoyancy and tend to attach to vertical and horizontal surfaces. The buoyancy forces of these micro-bubbles are inadequate to overcome the surface adhesion. Accordingly, these "micro-bubbles" may adhere to sensor surfaces and sensor reflectors. Large bubbles are typically formed from trapped air in enclosed spaces that get filled with the DEF. This often occurs in sensors that utilize covers, shrouds or other enclosures to provide a stable liquid environment for the sensor to operate (i.e., minimize liquid slosh or movement). To prevent the trapped air, these enclosures may provide venting apertures at the highest points to allow the air to escape. Additionally, fill apertures are provided at the lowest points to allow the liquid to enter the enclosure and displace the air. However, when these apertures are large enough to allow air to easily escape as liquid enters the shroud/enclosure, they also provide a path for "micro-bubbles" to be driven into the enclosures. Once inside the enclosure the "micro-bubbles" stick to critical surfaces, such as the reflector or sensor faces.

The smaller, "micro-bubbles", are generated under extreme agitation or aeration of the DEF. Typical causes are aeration during DEF tank filling and sloshing of DEF fluid due to the dynamic environment of a vehicle. Another source is the standard filling nozzle for DEF, which utilizes a venturi system to provide automatic shut-off of the nozzle when the DEF tank is full. This venturi system actually ingests air from the tank and entrains the air in the DEF as it goes through the nozzle into the DEF tank. For the most part, the entrained air eventually evolves out of the DEF and does not adversely impact on the system operation. However, some of the smaller ("micro-bubbles") affix themselves to the internal wails of the sensor enclosures and disrupt the sensor readings. Liquid agitation has been found to be inadequate to remove these bubbles. The most reliable way to remove "micro-bubbles" is to manually wipe the impacted surfaces and re-submerge the sensor. This is of course impractical for a sensor on an operating vehicle.

SUMMARY

In one example, a housing assembly for a fluid sensor assembly includes a housing having a first sensing volume and a second sensing volume. A fluid port is attached to the housing and has at least a first fluid aperture and second fluid aperture. At least one porous membrane is assembled between the fluid port and the housing, the at least one porous membrane covering the first and second fluid apertures. The first sensing volume comprises a vertically-oriented waveguide and is fluidly coupled to an exterior of the housing through the first fluid aperture, where the first aperture port has an area smaller than an area of a cross-section of the waveguide. The second sensing volume is coupled to the exterior of the housing through the second fluid aperture, the second fluid aperture having an area larger than a cross-section of the second sensing volume. while the first sensing volume and the second sensing volume are both in fluid communication with an exterior of the housing, the fluid port and porous membrane internally isolate the first sensing volume from the second sensing volume.

The fluid port may be planar. The at least one porous membrane may comprise a single sheet of porous membrane covering the first and second fluid apertures. A gasket may be disposed on the porous membrane for sealing purposes. The gasket may internally isolate the first sensing volume from the second sensing volume. These features may be combined.

The housing assembly may further comprising a first ultrasonic sensor under the waveguide, a second ultrasonic sensor at a bottom of the second sensing volume, and a target located a fixed distance above the second ultrasonic sensor.

The first sensing volume may further comprise a first vent to the exterior of the housing assembly at a top of the waveguide, and the second sensing volume may further comprise a second vent located at a top of the second sensing volume into the first sensing volume.

In another example, a housing assembly for a fluid sensor assembly includes a housing having a first sensing volume and a second sensing volume. The first sensing volume comprises a vertically oriented waveguide having a first sensor at a bottom of the waveguide and a first air vent to an exterior of the housing assembly at a top of the waveguide. The first sensor volume is fluidly coupled to an exterior of the housing through a first fluid aperture covered by a first area of porous membrane. The second sensing volume has a target at a fixed distance from a second sensor and a second air vent at a top of the second sensing volume. The second air vent vents into the first sensor volume. The second sensing volume is coupled to the exterior of the housing through a second fluid aperture covered by a second area of porous membrane. The first and second apertures do not provide internal fluid communication between the first sensing volume and the second sensing volume.

The target may be located vertically above the second sensor. The second sensing volume may further comprise an air accumulation volume above the target. The second air vent may be horizontal and provide a passage into the waveguide from the air accumulation volume.

The first area of porous membrane and the second area of porous membrane may be provided on a single sheet of porous membrane covering the first and second fluid apertures. The first and second fluid apertures may be provided on a planar fluid port. The sheet of porous membrane may be attached to the housing assembly by the fluid port.

DETAILED DESCRIPTION

Figure 1:
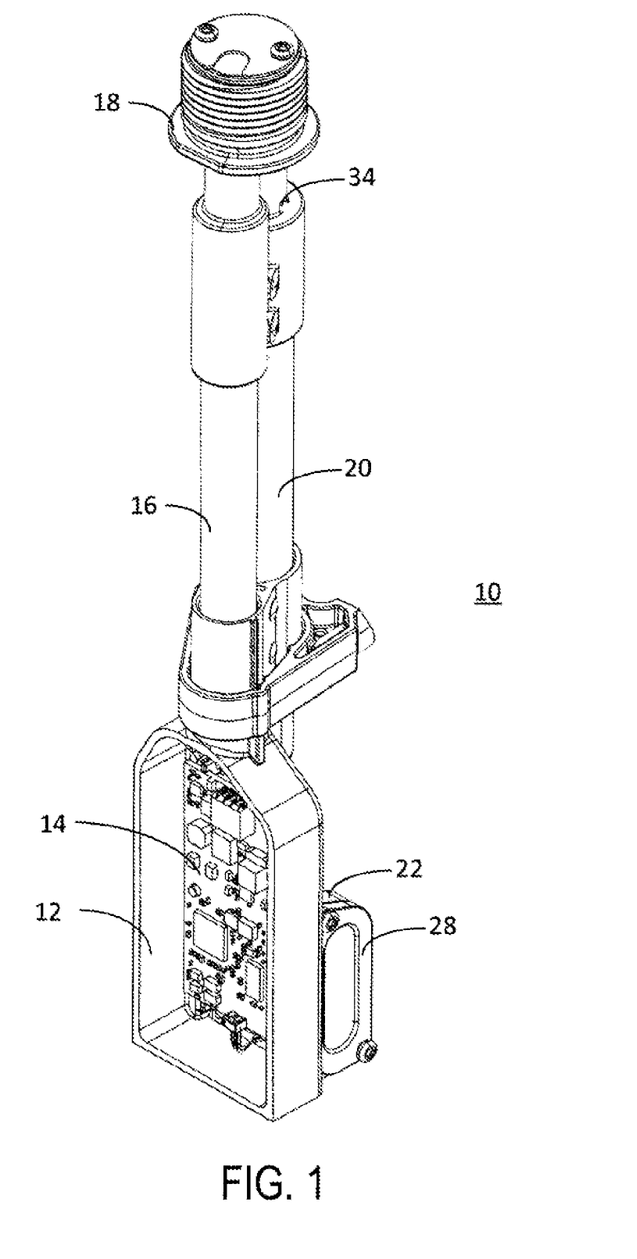
FIG. 1 is a perspective view of a first example of a DBF sensor assembly according to an aspect of the invention.

A first example of a DEF sensor assembly 10 is illustrated in FIG. 1. A DEF sensor assembly 10 is typically installed in a DEF reservoir or tank (not illustrated) The DEF sensor assembly 10 may include a controller housing 12, a controller 14 and a wiring conduit 16. The controller 14 is typically potted in waterproof material which has been omitted from the drawings to make the controller 14 visible. An adapter 18 is provided on top of the wiring conduit. The adapter 18 may be threaded to facilitate mounting in the DEF header or reservoir. Various provisions may be made for sensing DEF characteristics. For example, a fluid level sensing waveguide 20, such as a tube as illustrated, may be provided. Providing such a waveguide improves accuracy because the fluid inside the fluid level sensing waveguide 20 varies less than the DEF fluid tank in general, which may experience sloshing as a vehicle is in motion. A sensor element (not illustrated) is mounted under the level sensing waveguide 20 and electrically coupled to the controller.

Figure 2:
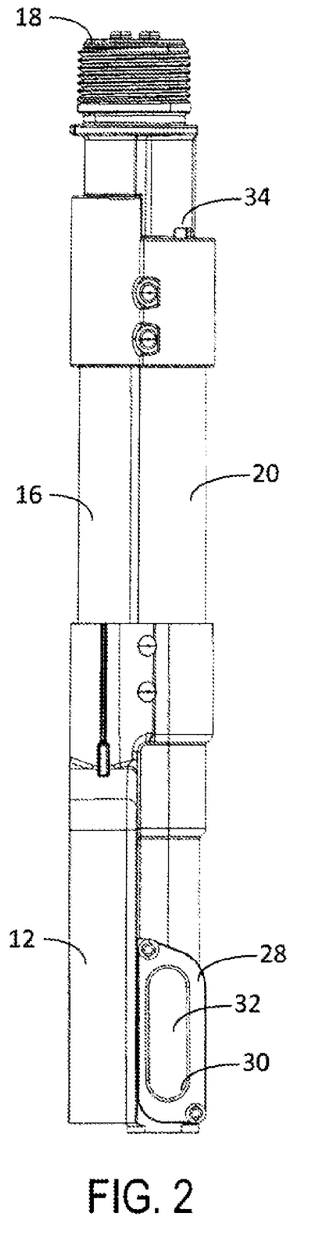
FIG. 2 is a side view of the DEF sensor assembly of FIG. 1.
Figure 3:
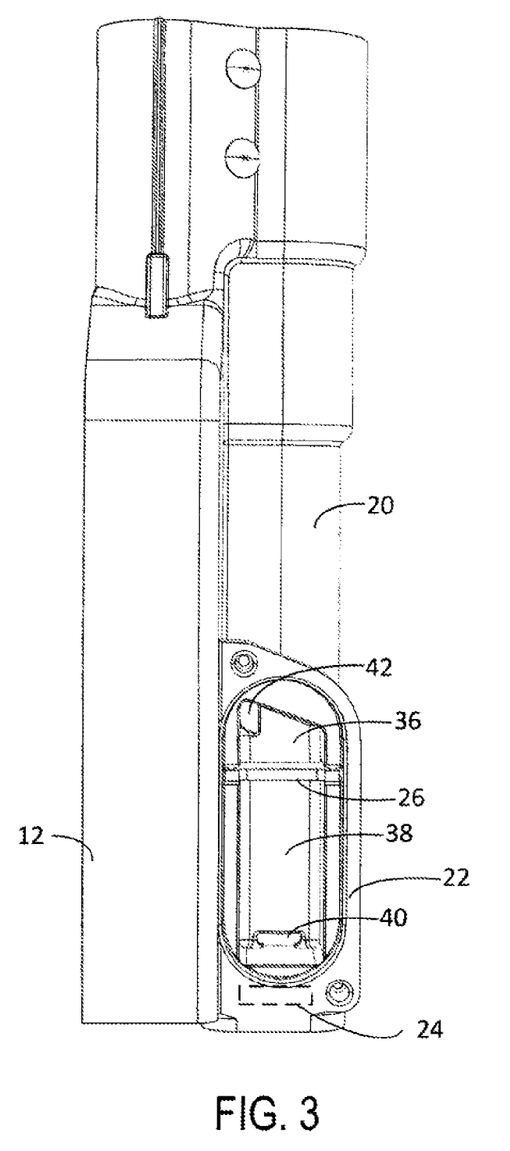
FIG. 3 is a side view of the DEF sensor assembly of FIG. 1 with a fluid port removed.

Referring to FIGS. 2 and 3, DEF concentration sensing housing 22 is also provided. The concentration sensing housing 22 comprises a DEF concentration sensor 24, a sensor reflector 26, and a housing fluid port 28. Sensor reflector 26 is dimensioned to allow air to pass between it and at least one wall of concentration sensing housing 22. Below the sensor reflector 26 is a sensor volume 38 and above the reflector is an air accumulation volume 36.

"Micro-bubbles" disadvantageously stick to various surfaces and remain in the sensing volume regardless of venting provisions for larger bubbles. According to one aspect of the present invention, "micro-bubble" attachment is mitigated by preventing micro-bubbles from entering the sensing volume in the first place. The housing fluid port 28 includes an aperture 30 and a porous media 32. The porous media 32 allows DEF fluid to fill the concentration sensing housing 22 through the aperture 30 while substantially blocking micro-bubbles from entering the sensing volume. In order to be effective, the porous media 32 should be the only path for fluid to enter the sensing volume from the main reservoir volume, no other liquid access points should exist. Porous media 32 may be mounted on the housing fluid port 28. Housing fluid port 28 may include an O-ring style gasket or seal to prevent ingress of bubbles around the housing fluid port 28. To further assist in preventing air from entering the sensing volume via the porous media 32, a hydrophilic media or treatment applied to the porous media 32 may be utilized. The hydrophilic aspect of the media encourages the media to be fully "wetted" to encourage free flow of the liquid and to ensure that no air is trapped in the media. A sensor 24 is located underneath the concentration sensing housing 22 and electronically coupled to the controller.

A fluid inlet 40 couples an interior volume of the concentration sensing housing 22 to the level sensing waveguide 20 to allow filtered DEF fluid to fill the level sensing waveguide 20 from the concentration sensing housing 22. The fluid inlet is located at the bottom of the concentration sensing housing 22.

In one advantageous aspect of the present invention, an air accumulation volume 36 is provided at the top of the concentration sensing housing 22 above the sensor reflector 26 for the air to collect prior to exiting the sensing volume. The air accumulation volume 36 provides a space for air to collect away from the sensor components. This way any remaining air that does not exit via a vent 42 will not interfere with the sensor readings. The shape of the air accumulation volume 36 may vary, as long as it provides a guidance path to the air vent.

While porous media 32 prevents bubbles from entering concentration sensing housing 22, it also prevents air bubbles from exiting the sensing volume. Accordingly, the air vent 42 may be provided at the top of the concentration sensing housing 22 and into the level sensing waveguide 20 to allow air to escape the accumulation volume 36. The top of the concentration sensing housing 22 may be angled or sloped to improve evacuation of trapped air and air bubbles. A waveguide vent 34 is provided at the top of the level sensing waveguide 20 to allow air to escape from the level sensing waveguide 20 into the reservoir, but at a level that reduces or prevents reintroduction of the air bubbles in the DEF and reduces or prevents fluid with entrained air bubbles from entering the level sensing waveguide 20.

If air vent 42 provided passage directly to the reservoir, such a vent would provide a path for "micro-bubbles" to enter the sensing volume during fill and sloshing. According to another aspect of the present invention, the vent exit 42 may be protected by connecting it to the level sensing waveguide 20 (which vents to the top of the reservoir through vent 34) or a separate extension ("snorkel") so that the vent outlet is high enough in the reservoir to prevent aerated fluid from entering the vent during a fill or slosh event. Venting into a snorkel or the waveguide has been found to be superior to known one-way valves (e.g., "duck bill" valve) at the vent. An issue with one way valves is that they provide too much resistance due to cracking pressure for all the air in the accumulator to exit Venting to the level sensing waveguide or to a snorkel provides a low resistance flow path while still preventing aerating fluid from entering the sensing volume. The air vent 42 in the concentration sensing volume is a direct port into the level sensing waveguide 20 to provide a shielded vent path. Additionally, FIG. 3 shows a fluid inlet 40 directly connecting the concentration sensing housing 22 and the level sensing waveguide 20. This provides two benefits. First, the rate of liquid entering and exiting the level sensor waveguide is dampened by the porous media 32 fluid path. This mitigates the effect of sudden changes in the liquid height, while still allowing the sensor to track fill and drain rates accurately. The second benefit is that the lower port encourages the exchange of liquid in the concentration sensor during slosh and liquid level changes ensuring that the concentration sensor volume is not isolated from the rest of the liquid in the tank. In order to promote "wetting" of the reflector and therefore allow air bubbles to release for the reflector (or another mechanical item in the chamber), a hydrophilic coating is applied. This coating helps the reflector to shed bubbles (large and small).

Figure 4:
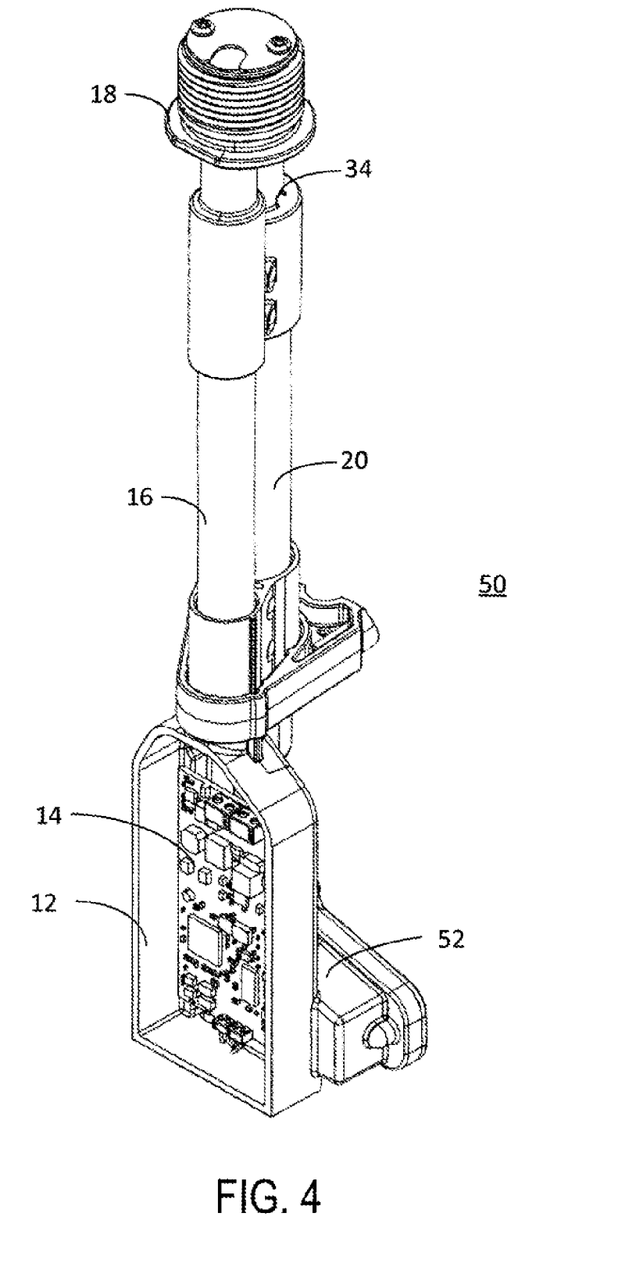
FIG. 4 is a perspective view of a second example of a DEF sensor assembly according to another aspect of the invention.
Figure 5:
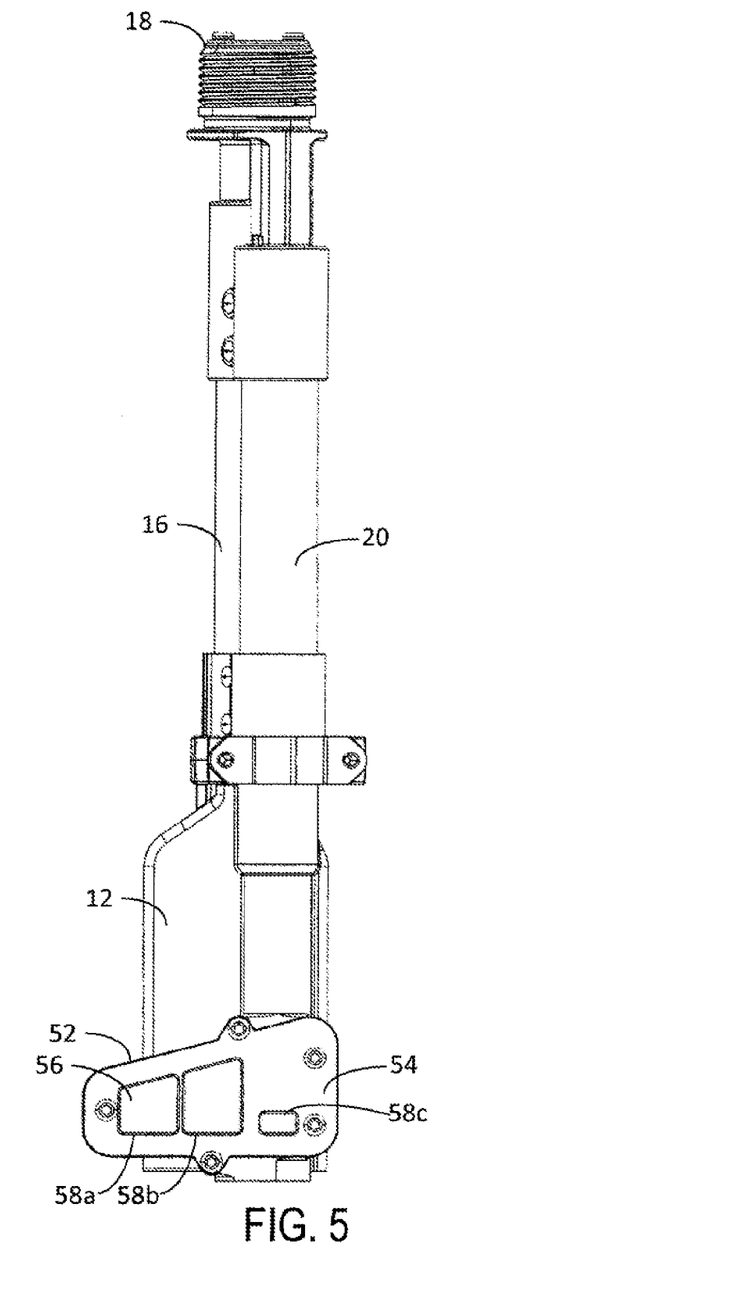
FIG. 5 is a side view of the DEF sensor assembly of FIG. 4.
Figure 6:
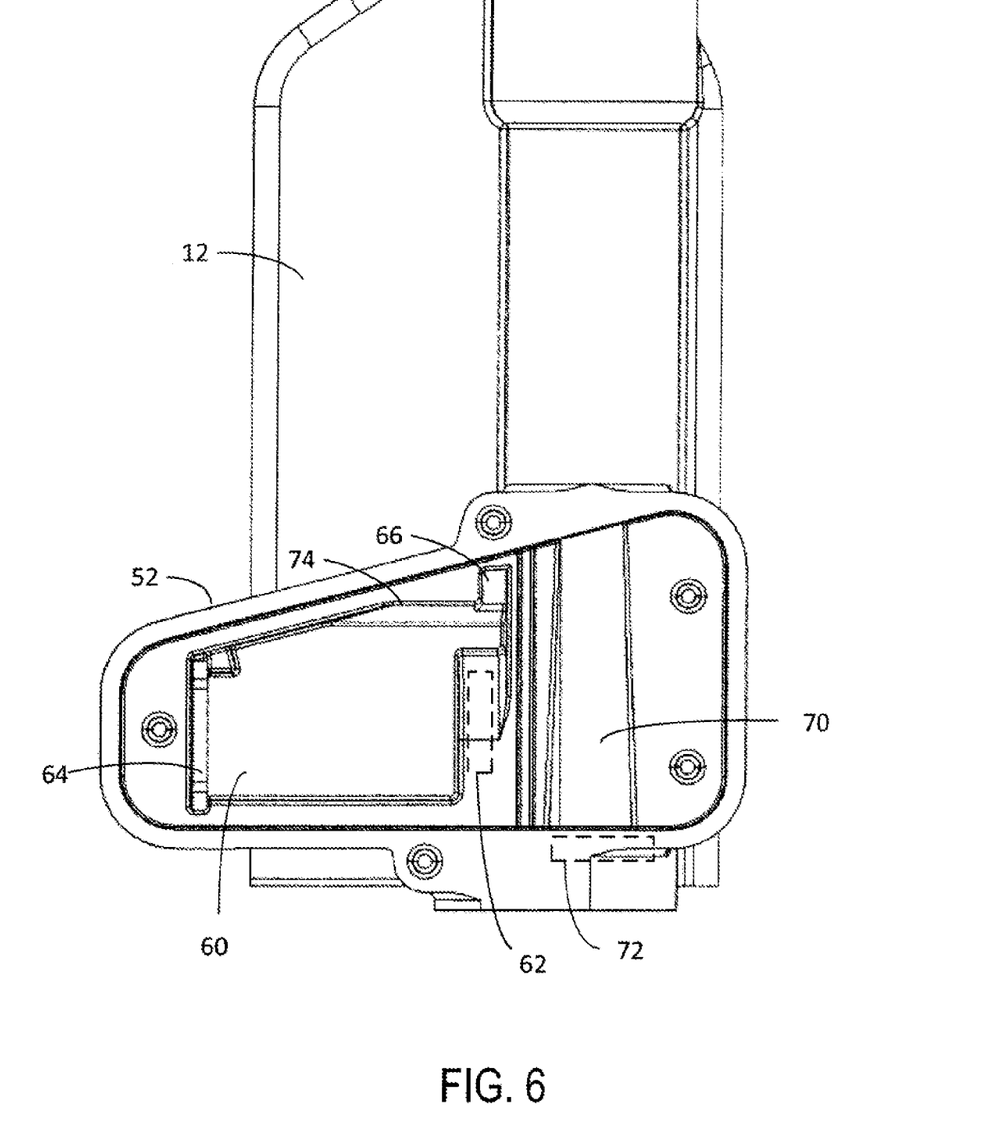
FIG. 6 is a side view of the DEF sensor assembly of FIG. 4 with a fluid port removed.

It has been found that it may be advantageous to fluidly isolate the concentration sensor volume from the level sensing waveguide. This provides greater control to address different needs for flow rates, fluid motion damping, and fluid dilution sensing. Also, if plain water is added to the DEF reservoir, the fluid in the level sensing waveguide will likely at least initially be at a higher urea concentration than the fluid in the rest of the DEF reservoir. Isolating the two sensing volumes fluidly prevents the higher concentration fluid in the level sensing waveguide from including an erroneous concentration measurement in the concentration sensing volume. Accordingly, another example of a DEF sensor assembly 50 is illustrated in FIGS. 4-6. Where components and/or features are the same between the examples, the same reference characters are used and the description of such components or features is not repeated.

A sensor housing 52 cooperates with a housing fluid port 54 and porous media 56 to define a concentration sensor volume 60 and separate level sensor volume 70. A sensor reflector 64 is located in the concentration sensor volume 60. Sensor reflector 64 is orientated vertically, and a sensor 62 (shown in phantom lines) is located on the opposite end of sensor volume 60. As before, "micro-bubble" attachment is mitigated by preventing micro-bubbles from entering the concentration sensor volume 60.

The porous media 56 allows DEF fluid to fill the concentration sensor volume 60 while substantially blocking microbubbles from entering the sensing volume. Porous media 56 may be mounted on fluid port 54. Fluid port 54 may include a plurality of apertures 58a, 58b, 58c to expose a desired area of porous media 56 to DEF fluid. The apertures 58a, 58b, 58c function as controlled-rate fluid entrances to the sensing chamber. Fluid port 54 may also have an O-ring style seal or other gasket to prevent ingress of bubbles around the frame. In another example, porous media 56 may be cut to approximately the same dimensions as fluid port 54 and sandwiched between fluid port 54 and sensor housing 52.

To further assist in preventing air from entering the sensor volumes 60, 70 via the porous media, a hydrophilic media or treatment applied to the porous media 56 may be utilized. In one example, the porous media may comprise polyester felt media rated at 25 microns. The hydrophilic aspect of the media encourages the media to be fully "wetted" to encourage free flow of the liquid and to ensure that no air is trapped in the media. The sensor 62 is embedded in the sensor housing 52 and electronically coupled to the controller 14.

While porous media 56 prevents bubbles from entering concentration sensor volume 60, it also prevents air bubbles from exiting the volume. Accordingly, an air vent 66 is provided at the top of the concentration sensor volume 60 to allow air to escape the concentration sensor volume 60 and return to the reservoir. The top of the concentration sensor volume 60 may be angled or sloped to improve collection of trapped air and air bubbles.

In one advantageous aspect of the present invention, the top of the concentration sensor volume 60 is sloped to guide bubbles away from sensor reflector 64. An air accumulation volume 74 may also be provided for the air to collect prior to exiting the sensing volume. The accumulation volume 74 provides a space for air to collect away from the sensor components. This way any remaining air that does not exit via the air vent 66 will not interfere with the sensor readings. The shape of the air accumulation volume 74 may vary, as long as it provides a guidance path to the air vent.

As described above, the air vent 66 may be protected by connecting to an extension ("snorkel") so that the vent outlet is high enough in the reservoir to prevent aerated fluid from entering the vent during a fill or slosh event.

A level sensor 72 (shown in phantom lines) is below level sensor volume 70, which is coupled to level sensing waveguide 20. A waveguide vent 34 is provided at the top of the level sensing waveguide 20 to allow air to escape from the level sensing waveguide 20 into the reservoir, but at a level that reduces or prevents reintroduction of the air bubbles in the DEF and reduces or prevents fluid with entrained air bubbles from entering the level sensor volume 70. The level sensor is electrically connected to the controller 14.

Operation of the concentration sensor 62 and sensor reflector 64 is relatively unaffected by movement of fluid in and out of the concentration sensor volume 60. Also, the concentration sensor needs to react quickly to "dilution events," that is, when plain water is added to the DEF reservoir instead of the required aqueous urea mixture. Accordingly, a surface area of porous media 56 exposed by the apertures in fluid port 54, fluidly coupling the reservoir to concentration sensor volume 60 through porous media 56 may be relatively large. In the illustrated example, two apertures 58a, 58b, are provided. This encourages the exchange of liquid in the concentration sensor during slosh and liquid level changes ensuring that the concentration sensor volume is not isolated from the rest of the liquid in the tank.

Conversely, the fluid level sensor provides more accurate operation with higher damping on flow rate of fluid in and out of the level sensor volume 70. To reduce tank sloshing from rapidly affecting fluid levels within the wave guide, one relatively small aperture 58c is provided in fluid port 54 to couple the reservoir to level sensor volume 70 through porous media 56. In one example, the area of aperture 58c is about one-tenth of the combined areas of apertures 58a and 58b. Because flow rates are proportional to the area of porous media 56 exposed by the apertures, level sensor volume 70 experiences much slower fluid fill and drain rates as compared to concentration sensor volume 60. The additional damping of fluid flow rates into and out of the level sensor volume 70 improves accuracy of fluid level measurements.

Figure 7:
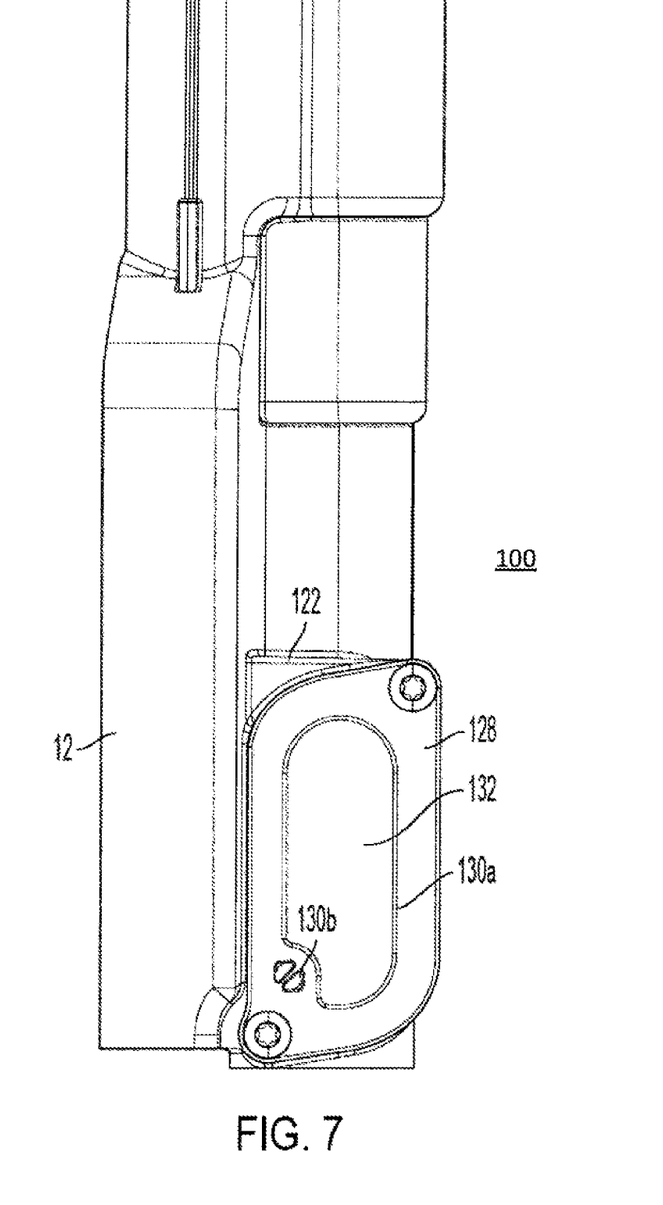
FIG. 7 is a side view of a third example of a DEF sensor assembly according to another aspect of the invention.
Figure 8:
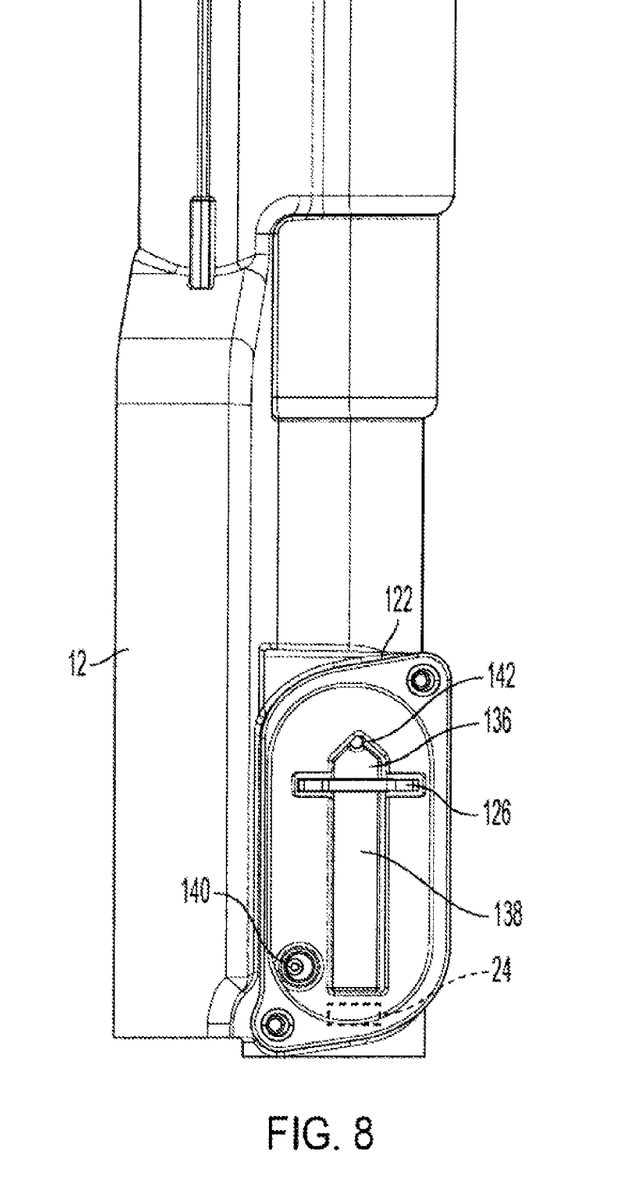
FIG. 8 is a side view of the DEF sensor assembly of FIG. 7 with a fluid port removed.
Figure 9:
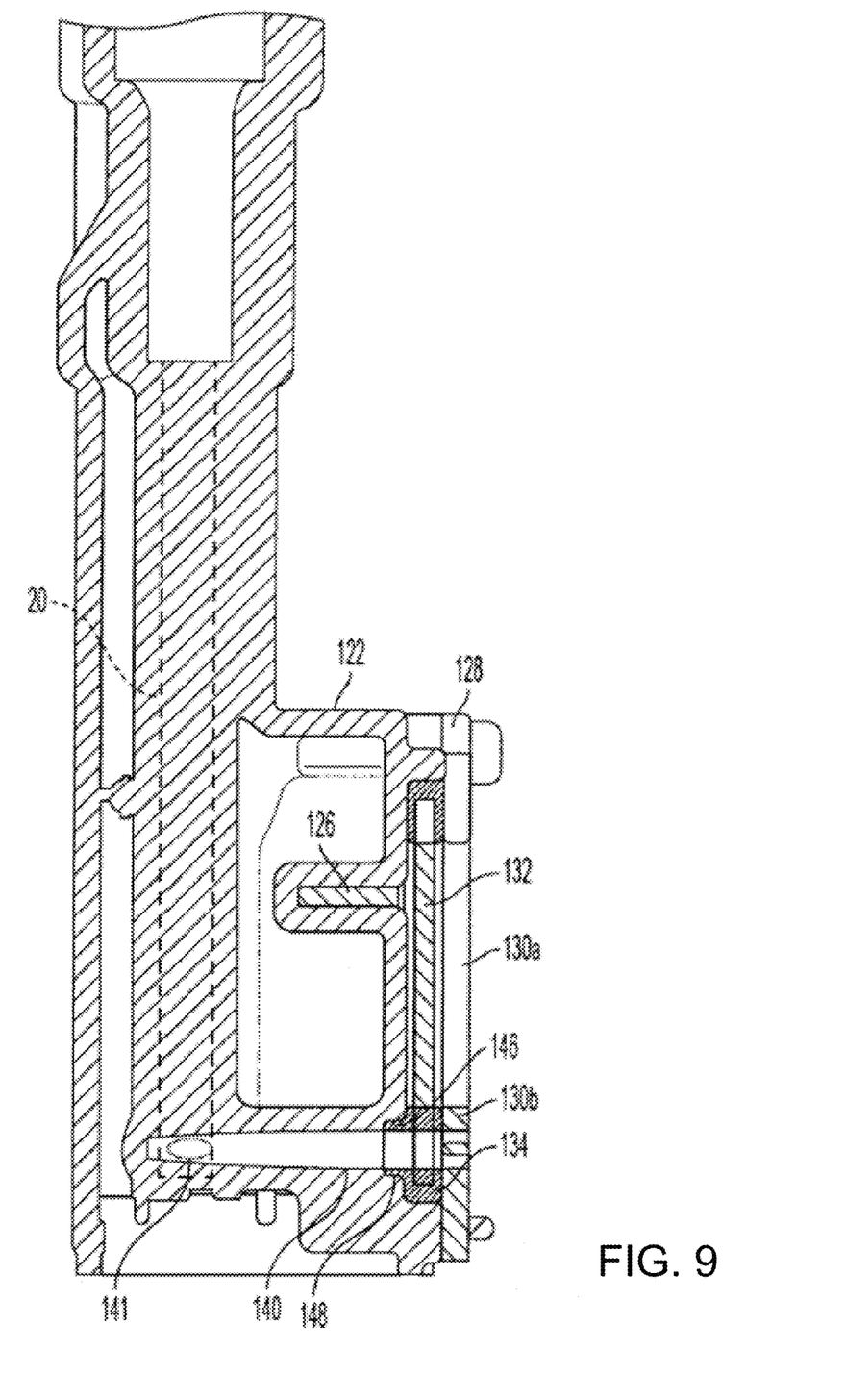
FIG. 9 is a cross-section of the side view of the DEF sensor assembly of FIG. 7.

Another example of a DEF sensor assembly 100 including features of both examples above and further improving sensor response is illustrated in FIGS. 7-9. Where components and/or features are the same between examples, the same reference characters are used and the description of such components or features is not repeated.

A DEF concentration sensing housing 122 is provided. The concentration sensing housing 122 comprises a DEF concentration sensor 24, a sensor reflector 126, and a housing fluid port 128. Sensor reflector 126 is dimensioned to allow air to pass between it and at least one wall of concentration sensing housing 122, such as a rear wall.

A concentration sensing volume 138 is provided below the reflector and an air accumulation volume 136 is provided at the top of the concentration sensing housing 122 above the sensor reflector 126. Air may collect in the air accumulation volume 136 prior to exiting the chamber. The air accumulation volume 136 provides a space for air to collect away from the sensor components. This way any remaining air that does not exit via a vent 142 will not interfere with the sensor readings. The shape of the air accumulation volume 136 may vary, as long as it provides a guidance path to the air vent 142.

According to one aspect of the present invention, "microbubble" attachment is mitigated by preventing microbubbles from entering the sensing volume. The housing fluid port 128 comprises an apertures 130a and 130b, and porous media 132 extending across both apertures. The porous media 132 allows DEF fluid to fill the concentration sensing housing 122 through the aperture 130a and the level sensing waveguide 20 through aperture 130b while substantially blocking micro-bubbles from entering either volume. Apertures 130a, 130b may be subdivided, as illustrated with 130b. Porous media 132 may be mounted on a side of the housing fluid port 128 facing the sensing volumes. Porous media 132 may be embedded in a gasket 134 (shown in FIG. 9) to seal the porous media to the housing fluid port 128, sensing housing 122, and fluid port 140. To improve sealing a seal boss 146 may be included on the gasket 134, and a corresponding recess 148 included on fluid port 140. To further assist in preventing air from entering the chamber via the porous media 132, a hydrophilic media or treatment applied to the porous media 132 may be utilized.

A sensor 24 (illustrated in phantom lines) is located underneath the concentration sensing housing 122 and electronically coupled to the controller 14 such that measurements are made vertically. To improve concentration sensor response to changing DEF concentration in the DEF reservoir, the concentration sensor volume 138 is narrow relative to the opening of aperture 130a and the area of porous media 132 such that an area of a vertical cross-section of the sensor volume 138 is smaller than an area of aperture 130a. Fluid port 140 couples aperture 130b to level sensing waveguide 20. If the level sensing waveguide 20 is offset from fluid port 140, an aperture 141 may be provided to complete the fluid path. Fluid port 140 and aperture 130b are relatively small to reduce fluctuations in fluid levels in the level sensing waveguide 20. In the illustrated example, an area of a horizontal cross-section of the level sensing waveguide is larger than an area of aperture 130b and/or an area of a vertical cross-section of fluid port 140.

An air vent 142 may be provided at the top of the concentration sensing housing 122 and into the level sensing waveguide 20 to allow air to escape from the concentration sensing housing 122. The top of the concentration sensing housing 122 may be angled or sloped to improve evacuation of trapped air and air bubbles. To prevent fluid in the level sensing waveguide 20 from affecting DEF concentration measurements, air vent 142 is preferably small to minimize ingress of DEF from the volume sensing waveguide 20. In one example, air vent 142 is as small as may practically be molded using conventional plastic molding techniques. In this way, the two sensing volumes are still effectively fluidly isolated. The air accumulation volume 136 permits the air vent 142 to be relatively small by isolating unvented air on the opposite side of the target from the sensor.

Because the air vent 142 in the concentration sensing housing 122 is a direct port into the level sensing waveguide 20 and the fluid in level sensing waveguide 20 entered through the porous media and fluid port 140, the air vent 142 provides a shielded path for the exhaust of air bubbles with low risk of reintroducing air bubbles from the main DEF reservoir.

Various features of the disclosed examples may be employed on the alternative examples. Also, while the present invention is being described with respect to sensors that utilize ultrasonic sensing, the concept or air removal applies to multiple sensor types. With sensing technologies that utilize a reflector as depicted above, the size of the reflector must allow for air to easily pass by from the lower (sensing) volume to the upper accumulation volume.

What is claimed is:

1. A housing assembly configured for a fluid sensor assembly, comprising:
    a housing having a first sensing volume;
    the first sensing volume comprising a vertically-oriented waveguide having a first sensor at a bottom of the waveguide and configured to make measurements vertically;
    wherein the first sensing volume is fluidly coupled to an exterior of the housing through a first fluid aperture covered by a first area of a porous membrane; and
    wherein the first fluid aperture has an area smaller than an area of a cross-section of the waveguide.

2. The housing assembly of claim 1, wherein the housing further comprises a second sensing volume.

3. The housing assembly of claim 2, wherein the first sensing volume and the second sensing volume are fluidly isolated.

4. The housing assembly of claim 2, wherein the second sensing volume comprises a target at a fixed distance from a second sensor.

5. The housing assembly of claim 2, wherein the second sensing volume comprises an air vent at a top of the second sensing volume, the air vent venting into the first sensing volume.

6. The housing assembly of claim 2, wherein the second sensing volume is fluidly coupled to the exterior of the housing through a second fluid aperture covered by a second area of the porous membrane.

7. The housing assembly of claim 6, wherein the second fluid aperture has an area larger than an area of a cross-section of the second sensing volume.

8. The housing assembly of claim 6, wherein the first and second fluid apertures are provided on a fluid port.

9. The housing assembly of claim 8, wherein the fluid port is planar.

10. The housing assembly of claim 1, wherein the porous membrane comprises a single sheet of porous membrane.

11. A housing assembly configured for a fluid sensor assembly, comprising:
    a housing having a first sensing volume and a second sensing volume, wherein the first sensing volume comprises a vertically-oriented waveguide and wherein vertical measurements of the first sensing volume are made by a sensor;
    a fluid port comprising a first aperture, wherein the first aperture is fluidly coupled to the first sensing volume, wherein the fluid port further comprises a second aperture fluidly coupled to the second sensing volume; and wherein the first sensing volume and the second sensing volume are fluidly isolated.

12. The housing assembly of claim 11, wherein the first aperture has an area smaller than an area of a cross-section of the waveguide.

13. The housing assembly of claim 11, wherein the second aperture has an area larger than an area of a cross-section of the second sensing volume.

14. The housing assembly of claim 11, wherein the fluid port is planar.

15. The housing assembly of claim 11, wherein a porous membrane covers the first and the second apertures.

16. The housing assembly of claim 15, wherein the porous membrane is a single sheet of porous membrane.

17. The housing assembly of claim 15, further comprising a gasket disposed on the porous membrane.

18. The housing assembly of claim 17, wherein the gasket internally isolates the first sensing volume from the second sensing volume.

* * * * *